US006626440B2

United States Patent
Halling (10) Patent No.: US 6,626,440 B2
(45) Date of Patent: *Sep. 30, 2003

(54) RESILIENT SEALS WITH INFLECTION REGIONS AND/OR PLY DEFORMATION

(75) Inventor: Horace P. Halling, Durham, CT (US)

(73) Assignee: Jetseal, Inc., Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/938,553

(22) Filed: Aug. 27, 2001

(65) Prior Publication Data

US 2002/0020971 A1 Feb. 21, 2002

Related U.S. Application Data

(63) Continuation of application No. 09/301,363, filed on Apr. 29, 1999, now Pat. No. 6,299,178.

(51) Int. Cl.⁷ .............................................. F16L 17/025
(52) U.S. Cl. ...................................... 277/626; 277/654
(58) Field of Search .............................. 277/626, 627, 277/654, 644, 647, 530

(56) References Cited

U.S. PATENT DOCUMENTS

| 2,631,908 | A | 3/1953 | Teetor |
|---|---|---|---|
| 3,012,802 | A | 12/1961 | Waite |
| 3,192,690 | A | 7/1965 | Taylor |
| 3,575,432 | A | 4/1971 | Taylor |
| 3,588,131 | A | 6/1971 | Nicholson |
| 3,751,048 | A | 8/1973 | Rode |
| 3,761,102 | A | 9/1973 | Nicholson |
| 3,797,836 | A | 3/1974 | Halling |
| 3,857,572 | A | 12/1974 | Taylor et al. |
| 4,121,843 | A | 10/1978 | Halling |
| 4,199,151 | A | 4/1980 | Bartos |
| 4,589,666 | A | 5/1986 | Halling |
| 4,602,795 | A | 7/1986 | Lillibridge |
| 4,759,555 | A | 7/1988 | Halling |
| 4,779,901 | A | 10/1988 | Halling |
| 4,784,397 | A | 11/1988 | Tozer |
| 4,798,392 | A | 1/1989 | Tozer |
| 4,813,692 | A | 3/1989 | Halling et al. |
| 4,854,600 | A | 8/1989 | Halling et al. |
| 5,249,814 | A | 10/1993 | Halling |
| 5,368,069 | A | 11/1994 | Felber |
| 5,433,370 | A | 7/1995 | Halling |
| 5,435,576 | A | 7/1995 | Rode |
| 5,505,498 | A | 4/1996 | Halling et al. |
| 5,630,593 | A | 5/1997 | Swensen et al. |
| 5,716,052 | A | 2/1998 | Swensen et al. |
| 6,227,546 | B1 * | 5/2001 | Halling ........................ 277/312 |
| 6,237,921 | B1 * | 5/2001 | Liotta et al. ................. 277/630 |
| 6,325,392 | B1 * | 12/2001 | Halling ........................ 277/654 |
| 6,352,267 | B1 * | 3/2002 | Rode ............................ 277/631 |

* cited by examiner

Primary Examiner—William L. Miller
(74) Attorney, Agent, or Firm—Baker & Hostetler LLP (57) ABSTRACT

A seal of single or multiple plies and/or single or multiple convolution regions features inflection regions to arrest or reduce bending stress in the seal's acute bend regions and/or ply deformations on non-pressure-facing plies. Additionally, there is disclosed the combined use of multiple-ply seals incorporating the inflection regions in each ply and deformations on non-pressure-facing plies.

11 Claims, 9 Drawing Sheets

RESILIENT SEALS WITH INFLECTION REGIONS AND/OR PLY DEFORMATION

This application is a continuation of U.S. application Ser. No. 09/301,363, filed Apr. 29, 1999, now U.S. Pat. No. 6,299,178.

FIELD OF INVENTION

The invention relates to a resilient seal.

BACKGROUND OF INVENTION

Resilient seals, for the purpose of confining fluids at high or low temperatures and/or pressures, are known and used in numerous applications, such as applications where a fluid (liquid and/or gas) is to be confined between cooperating components, the sealing faces of which are varying distances from one another.

Resilient metallic seals produced from materials having desirable high temperature, fatigue, relaxation, and oxidation resistant properties are useful for their ability to accommodate variations in operating length (the distance between sealing surfaces in cooperating members of a joint) in the direction of the longitudinal axis of the seal (the axis perpendicular to the circumference of the seal). Variations in operating length may, for example, occur due to one or a combination of the following: relative thermal expansions or contractions of components and assemblies in which a seal is housed; mechanical vibration; sealing face deformations; or varying separation of adjacent sealing face surfaces as a result of initial assembly or subsequent re-assembly after maintenance or repair. Of course, it will be recognized that the preceding list is not exclusive and represents examples of various modalities by which variations in operating length may occur. It is desirable that a seal remain in constant contact with each sealing surface so as to prevent leakage of fluid into or out of a system, depending on the placement of the seal and the area of high pressure in relation to the seal.

Some resilient seals rely upon internal spring forces and pressure energization to establish and maintain contact forces sufficient to ensure low leakage rates. Convolution type seals, such as multiple-convolution seals or single-convolution seals, such as for example those with general E-shaped cross-section, are particularly well suited for applications which require the accommodation of sealing face displacement along the longitudinal axis. Such seals, for example, may be used where high temperatures and ease of disassembly of joints is vital to the economic operation of systems, such as in applications associated with aircraft engines. Examples of convolution seals are disclosed in U.S. Pat. Nos. 3,797,836 and 4,121,843, both to Halling.

For applications in which axial deflections are extreme, multiple-ply seals, such as those in accordance with U.S. Pat. No. 5,249,814 to Halling, may be employed. An advantage of multiple-ply seals is that they can accommodate n times the amount of axial displacement as a single-ply seal, while containing the same level of pressure or vacuum. The variable "n" represents the number of plies of the seal.

Figure 1:
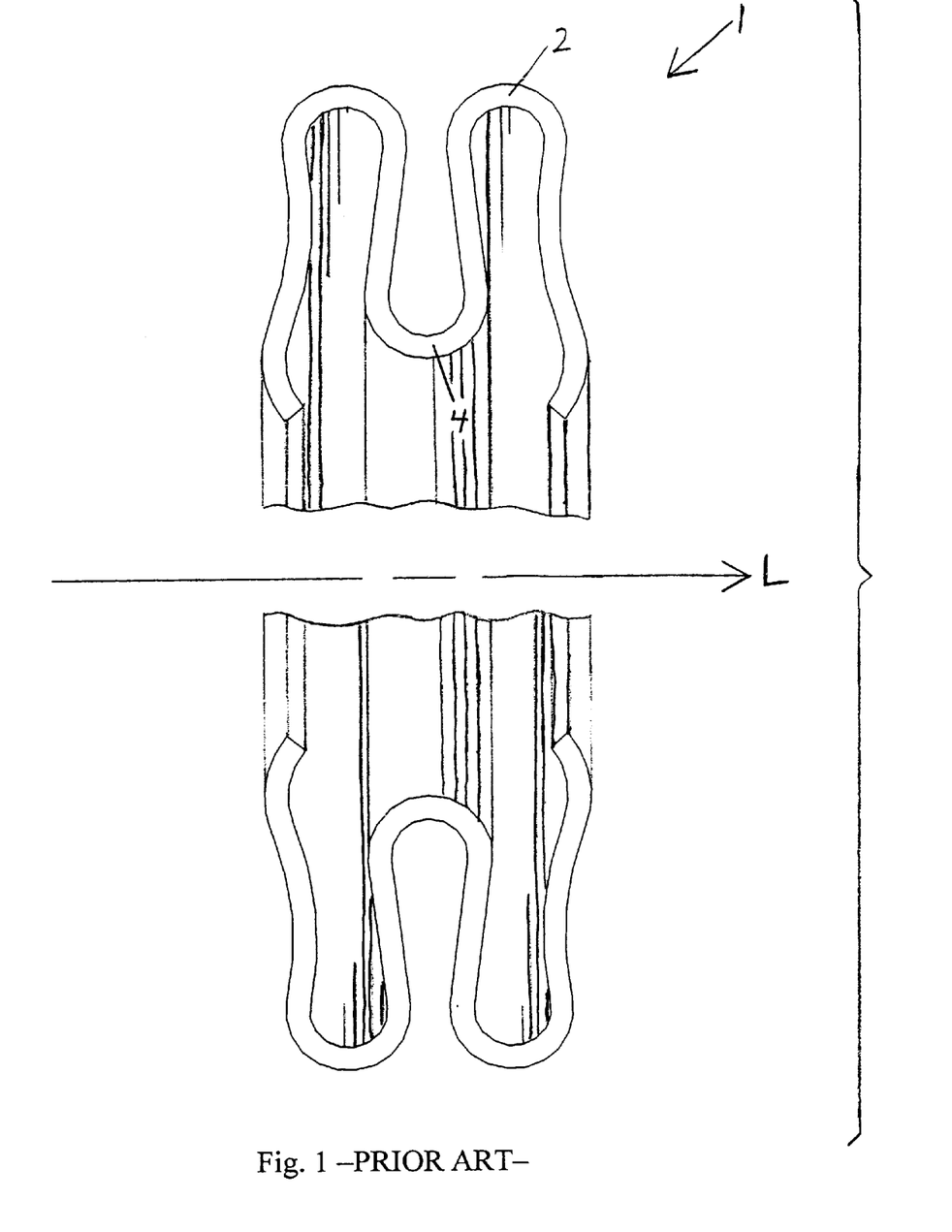
FIG. 1 is a side sectional cutaway view of a prior art single-ply convoluted seal.

However, in some seals of the prior art, an example of which is shown in FIG. 1, a limitation for displacement along the longitudinal axis L may be reached when a bending stress in a crest 2 or a root 4 of a seal 1 approaches a limiting value of, e.g., yield stress, fatigue stress, or relaxation stress, of the material from which the seal is constructed.

SUMMARY OF INVENTION

Accordingly, one object of the invention is to provide a seal which, by virtue of the incorporation of inflection regions, arrests the bending stress in the seal's crests and/or roots before a limiting value, for example, of yield stress, fatigue stress, or relaxation stress is reached, while simultaneously allowing the axial displacement along the seal's longitudinal axis to continue until a different and less stressed region of the seal reaches its limiting value.

Another object of the invention is to teach the use of inflection regions in both single and multiple-ply seals, thereby permitting in some embodiments an improved range of longitudinal axial displacement capability of the seal. Another object of the invention is to teach the use of deformations of non-pressure facing plies of multiple-ply seals. Yet another object of the invention is to teach the combination of inflection regions and ply deformations in multiple-ply seals.

The foregoing objects are attained by providing, in an embodiment, a seal featuring at least one convolution region, at least two acute bend region regions, two leg regions, and two leg termination region regions. A convolution region is comprised of a circular arc or compound curve and two sidewall regions, each sidewall region joining the circular arc or compound curve with an acute bend region region. Each acute bend region region joins a sidewall region with a leg region. Each leg region has at its free end a leg termination region region. An inflection region may be provided in each leg region of the seal and/or, if desired, in selected sidewall regions of the seal. Multiple-ply seals according to the present invention may have plies nested in intimate contact with one another. The leg regions and/or sidewall regions of the multiple-ply seals may incorporate the inflection regions as described above.

DETAILED DESCRIPTION OF THE INVENTION

Figure 2:
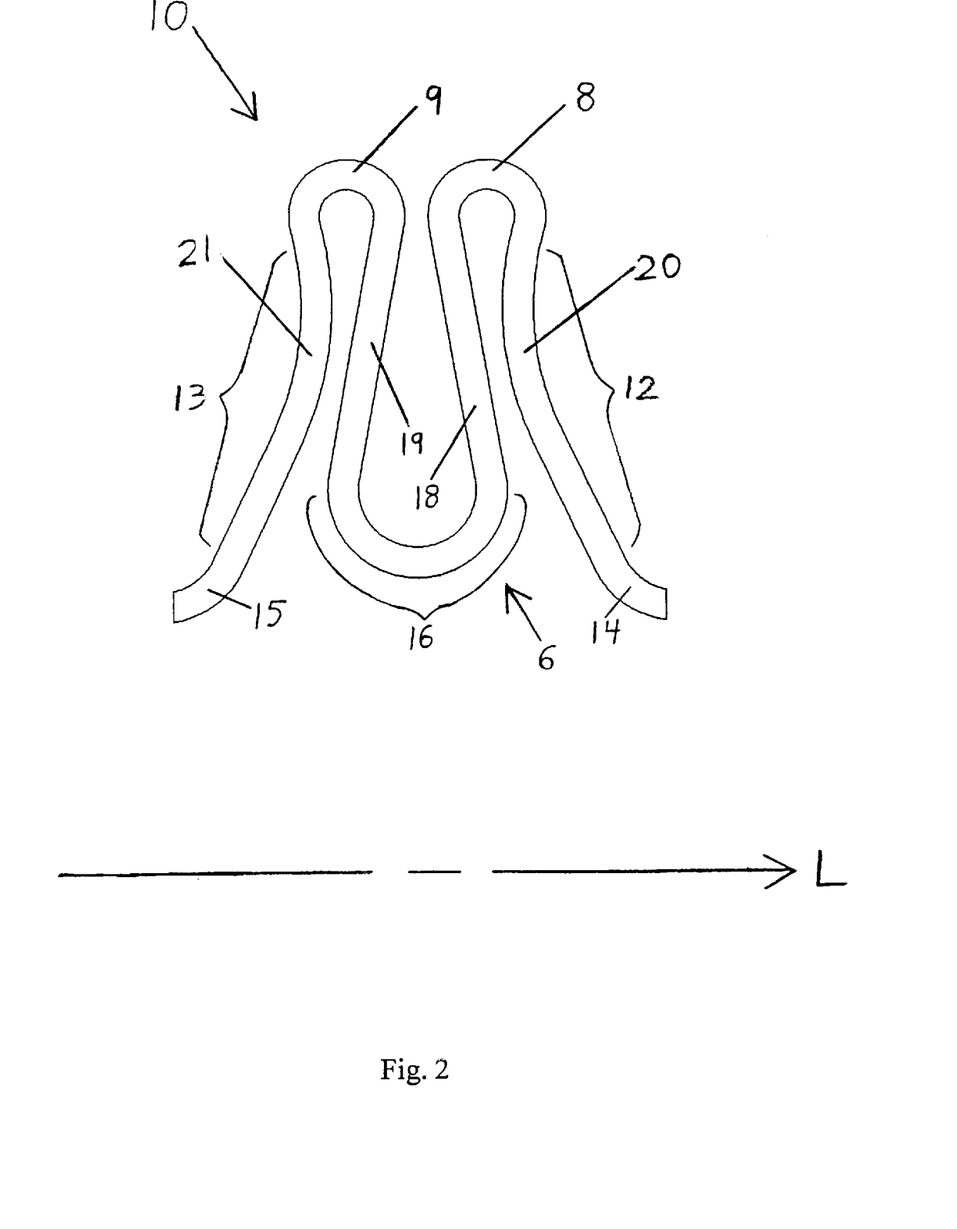
FIG. 2 is a side sectional cutaway view of one preferred embodiment of the invention.

Referring now to a preferred embodiment of the invention depicted in FIG. 2, a seal 10 is comprised of a convolution region 6, two acute bend region regions 8 and 9, two leg regions 12 and 13, and two leg termination regions 14 and 15. The convolution region 6 is comprised of a curved region 16, which can be any curved, or compound curved shape (e.g., a partial circle or a partial ellipse) and two sidewall regions 18 and 19. The sidewall regions 18 and 19 extend between the curved region 16 and acute bend region regions 8 and 9, respectively. Acute bend region 8 joins sidewall region 18 with a leg region 12. Acute bend region 9 joins sidewall region 19 with a leg region 13. Each leg region 12 and 13 has at its free end a leg termination region 14 and 15, respectively. Inflection regions 20 and 21 are provided along the circumference of leg regions 12 and 13, respectively.

As used herein, the term "inflection region" describes a physical feature (e.g., an indentation, bend or curved area on the surface of the seal), that is provided to control the distance, and cause contact between, a leg region (e.g., leg region 12 of FIG. 2) and the sidewall region adjacent to the leg region (e.g., sidewall region 18 of FIG. 2) when a certain degree of seal compression occurs. The inflection region may have a curved or angular shape, and will have its convex-most side projecting toward an adjacent sidewall region or leg region with which the inflection region is intended to contact.

The inflection regions 20 and 21 provide the benefit that, upon a certain degree of seal compression, they can arrest bending stress in the acute bend region regions 8 and 9 or curved region 16 of the seal while simultaneously transferring the stress to another less stressed area of the seal. A seal may be installed in a cavity having a recommended depth, for example a cavity may be comprised of opposing grooves or channels. As used with respect to this and other embodiments, the term "nominally compressed height" refers to the height of the seal when installed the cavity, and the cavity being at its recommended depth. A gap may be present between sidewall region 18 and leg region 12 and/or between sidewall region 19 and leg region 13, when a seal according to the present invention is installed and compressed to its nominally compressed height. When this gap is present, and the seal is initially compressed along its longitudinal axis L, bending stresses will occur in acute bend region regions 8 and 9.

As longitudinal axis compression continues, inflection regions 20 and 21 contact sidewall regions 18 and 19, respectively and bending stress at acute bend region regions 8 and 9 is arrested. Of course, simultaneous contact of all inflection regions 20 and/or 21 with corresponding sidewall regions 18 and/or 19 is not required. In various embodiments disclosed herein, depending on the particular configuration, the maximum bending stress in acute bend region regions 8 and/or 9 may remain constant, increase more slowly than if no inflection region were present, or may decrease with continuing longitudinal axis compression. The position of maximum bending stress in the seal may be transferred away from acute bend region regions 8 and 9 towards the inflection regions 20 and 21. After an inflection region, for example inflection region 20, contacts an adjacent sidewall region, for example sidewall region 18, the stress configuration in that portion of the seal 10 is analogous to a continuous beam, for longitudinal-axis (meridional) deflections so that the maximum bending stress occurring in the seal for a given load and moment is reduced compared to that in a similar seal without the inflection regions 20 or 21, because the stress configuration in such a seal without the inflection regions is analogous to an encastre cantilever beam. A seal may occur between an inflection region and a sidewall region; this does not adversely affect the stresses in the seal.

Figure 3:
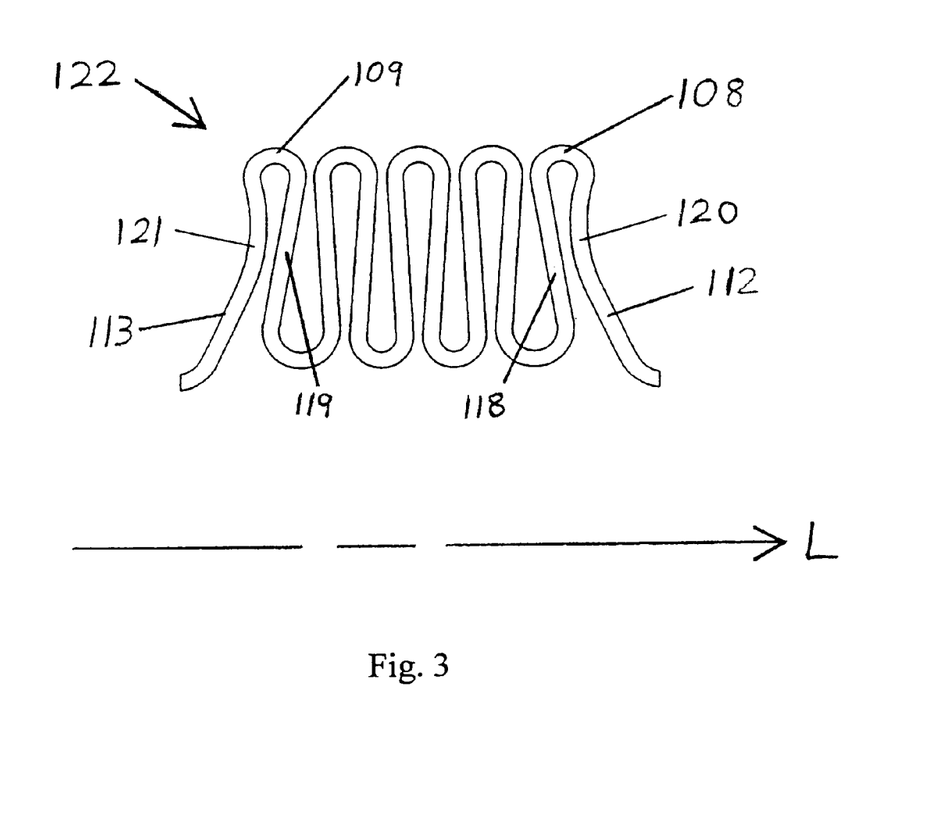
FIG. 3 is a side sectional cutaway view of a seal according to a second preferred embodiment.

Of course, the invention as disclosed herein may be implemented in multiple-convolution seals as well. One such possible implementation is shown in the preferred embodiment depicted in FIG. 3. A multiple-convolution seal in accordance with the present invention 122 can provide improved deflection capabilities. As depicted in FIG. 3, a multiple-convolution seal in accordance with the present invention 122, features inflection regions 120 and 121, that are located on leg regions 112 and 113, respectively, close to the mid-span of the convolution's sidewall regions 118 and 119. These inflections regions 120 and 121 arrest bending stress increases in acute bend regions 108 and 109 and transfers stress to the convoluted, bellows-like, mid-section of the seal 122. This results in a more uniform stress distribution and a higher overall deflection capability.

Figure 4:
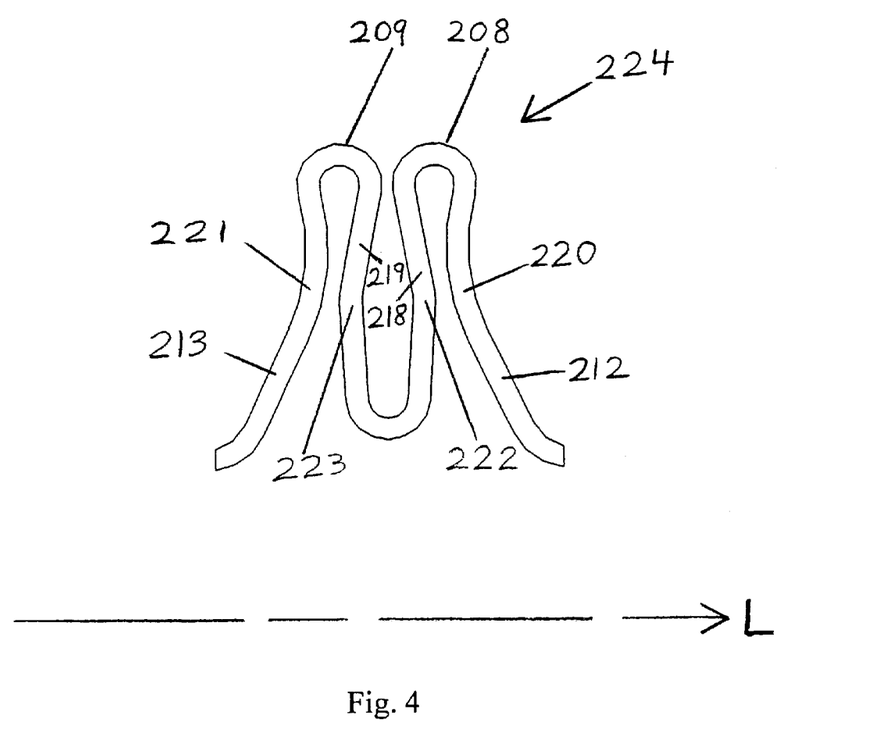
FIG. 4 is a side sectional cutaway view of a seal according to a third preferred embodiment.

Another preferred embodiment is depicted in FIG. 4. A seal 224 according to the preferred embodiment depicted in FIG. 4 achieves bending stress arrest, which in some cases causes a reversal or a reduction in the maximum bending stress, through implementation of inflection regions 220, 221, 222, and 223 on both its leg regions 212 and 213 and its sidewall regions 218 and 219.

In this and other embodiments, the absolute location of the inflection regions 220, 221, 222, and 223 along the circumference of the leg regions 212 and 213 and sidewall regions 218 and 219 is not a limitation of the invention. It is preferable that the inflection regions on a given sidewall region 218 or 219 and its nearest leg region 212 or 213, respectively, maintain a generally adjacent relationship. However, radial displacement, toward or away from the longitudinal axis L, of a given inflection region with respect to an adjacent inflection region is permitted. The inflection regions may be continuous around the circumference of the seal, or may be discontinuous and anywhere along the circumference of the leg regions or sidewall regions of the seal.

Adjacent inflection regions (e.g., inflection regions 220 and 222 and inflection regions 221 and 223 in seal 224 shown in FIG. 4) result in a control of the distance, and cause contact between, the sidewall regions and leg regions (i.e., between sidewall region 218 and leg region 212 and between sidewall region 219 and leg region 213 of seal 224 shown in FIG. 4) of a seal. A gap may exist between sidewall region 218 and leg region 212 and/or between sidewall region 219 and leg region 213 at their respective inflection regions even after the seal is installed, for example, in opposing grooves or channels, and compressed to its nominally compressed height. When the seal is initially compressed along its longitudinal axis, bending stresses will occur in acute bend regions 208 and/or 209. As longitudinal axis compression continues, inflection regions 220 and 221 in the sidewall regions 218 and 219, respectively, contact the inflection regions 222 and 223 in the leg regions 212 and 213, respectively. This contact causes bending stress at acute bend regions 208 and 209 to be arrested. The position of maximum bending stress in the seal 224 may be transferred towards the inflection regions 220, 222, 221, and 223.

Figure 5A:
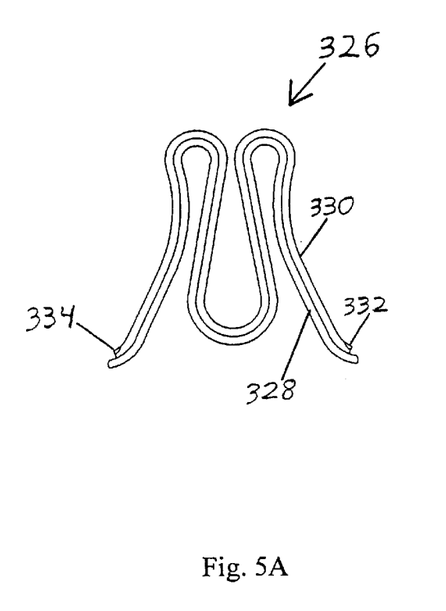
FIG. 5A is a side sectional cutaway view of a seal according to a fourth preferred embodiment, shown in an unrestrained condition.
Figure 7A:
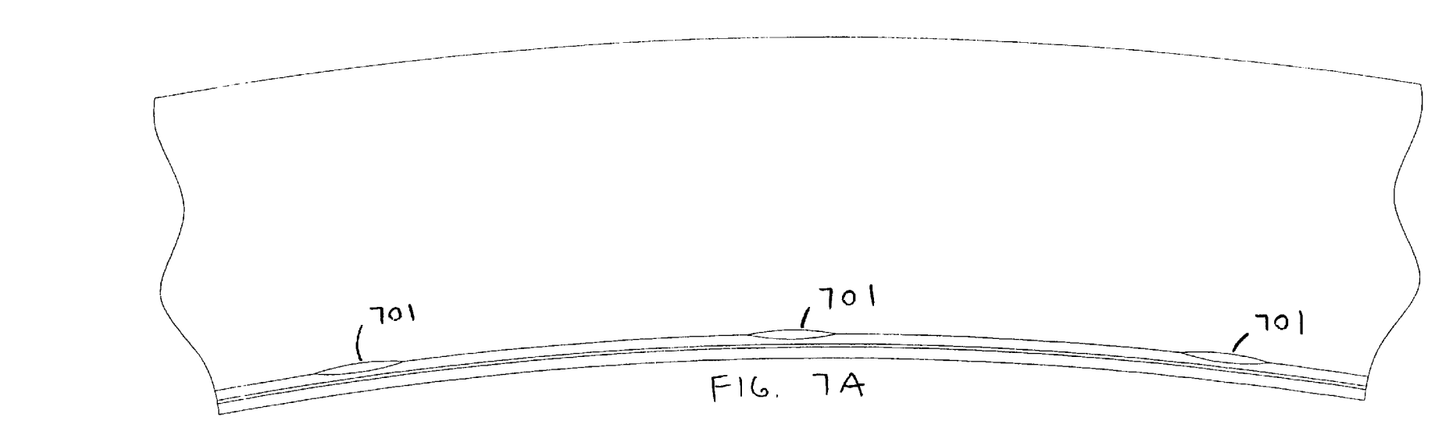
FIG. 7A is a side cutaway view of a seal having a scalloped edge on its secondary ply.
Figure 7B:
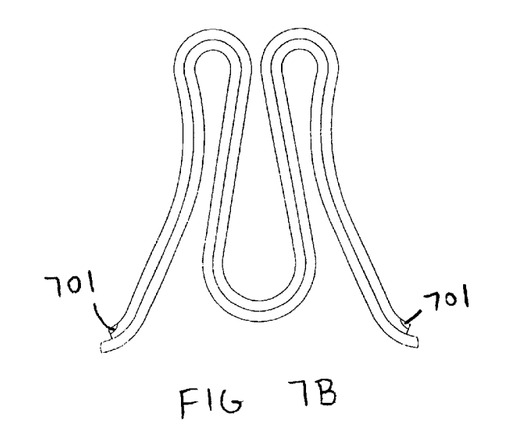
FIG. 7B is a cross-sectional view of the seal shown in FIG. 7A.
Figure 8A:
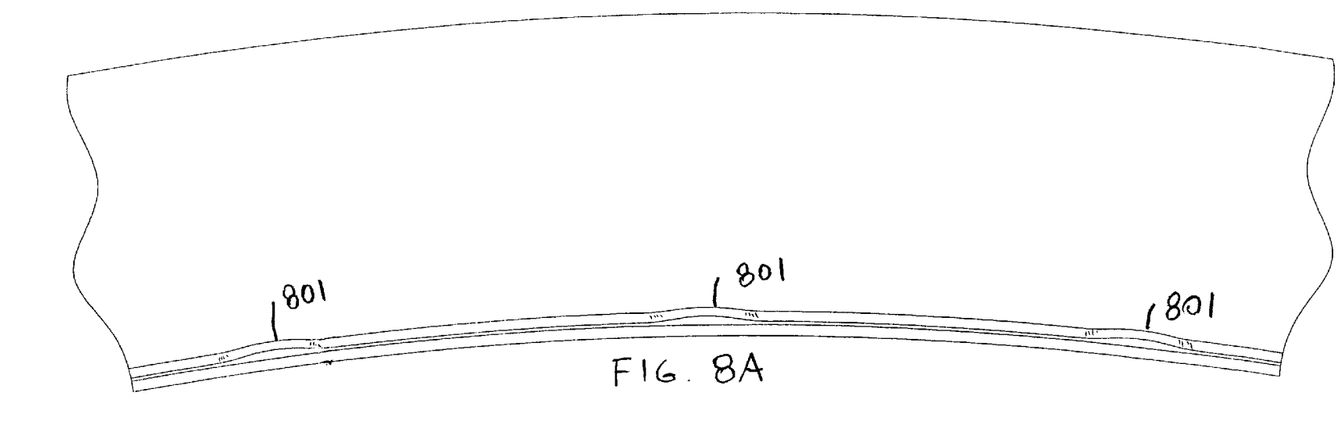
FIG. 8A is a side cutaway view of a seal having a waved edge on its secondary ply.
Figure 8B:
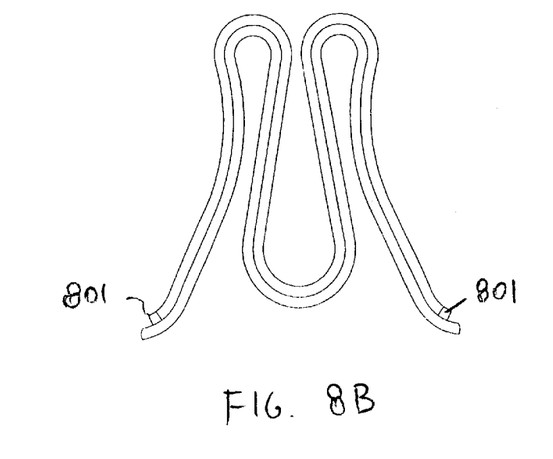
FIG. 8B is a cross-sectional view of the seal shown in FIG. 8A.
Figure 9A:
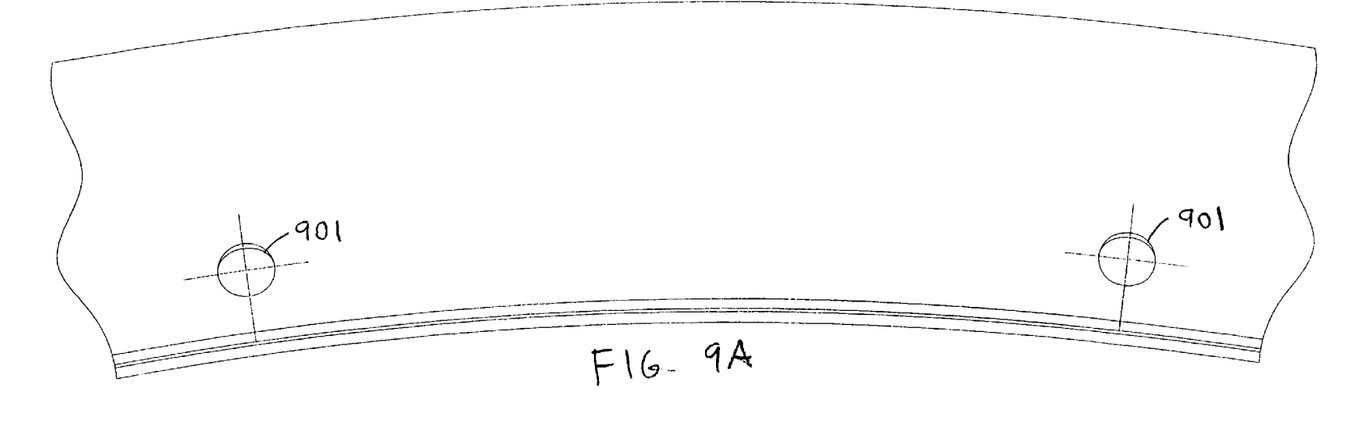
FIG. 9A is a side cutaway view of a seal having a perforated secondary ply.
Figure 9B:
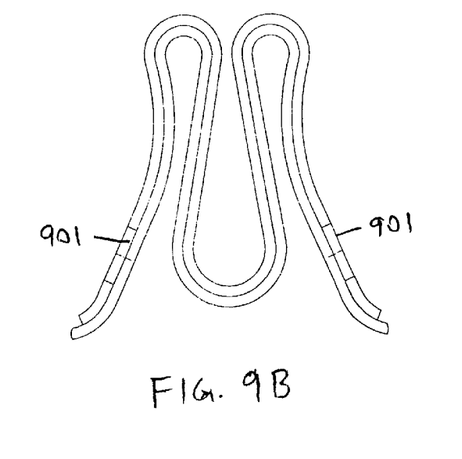
FIG. 9B is a cross-sectional view of the seal shown in FIG. 9A.

As will be understood by those skilled in the art, this invention may be used in combination with multiple-ply construction, e.g., in conjunction with the inter-ply sealing features of U.S. Pat. No. 5,249,814 and other seals. FIG. 5A depicts a preferred embodiment of the present invention as implemented in a multiple-ply seal 326. It will be obvious to those skilled in the art that any number of plies may be built up in the manner shown; the limit being only that of size or available space. In the preferred embodiment of FIG. 5A, for example, two, intimately contacting, nested plies 328 and 330 are depicted. The non-pressure-facing ply 330 may be shorter than the pressure-facing ply 328; and, the edges 332 and 334 of the non-pressure facing ply 330 may be deformed, for example with small scallops. The scallops may be replaced or augmented by small perforations in the non-pressure-facing ply 330. Other design choices, in addition to or in lieu of the exemplary scallops, such as waviness along the edges 332 and 334 of the non-pressure-facing ply 330 or through-cuts in the non-pressure-facing ply 330 may also be employed. Of course, such deformations as described above may be implemented in any or all of the non-pressure-facing plies of multiple-ply seals. The two-ply seal shown in FIG. 5A is just one example of a multiple-ply seal. The deformations, described by example above, may be provided to preclude inter-layer sealing in multiple-ply seals. FIGS. 7A through 9B show examples of deformations that are suitable for use on non-pressure-facing plies of multiple-ply seals. FIG. 7A is a side cutaway view of a seal having a scalloped edge on its secondary ply having scalloped portions 701. FIG. 7B is a cross-sectional view of the seal shown in FIG. 7A. FIG. 8A is a side cutaway view of a seal having a waved edge on its secondary ply, with wavy portions 801. FIG. 8B is a cross-sectional view of the seal shown in FIG. 8A. FIG. 9A is a side cutaway view of a seal having a perforated secondary ply with perforations 901. FIG. 9B is a cross-sectional view of the seal shown in FIG. 9A.

These ply deformations, for use on non-pressure-facing plies of multiple-ply seals, are not limited to seals having inflection regions, or to convolution seals. The ply deformations may be provided at or near the edge of the leg termination regions, as in for example, portions 701 and 801, or may be in other portions of the ply, as in for example, perforation 901. The ply deformations may be employed according to the present invention for multiple-ply seals having any suitable cross-section.

Figure 5B:
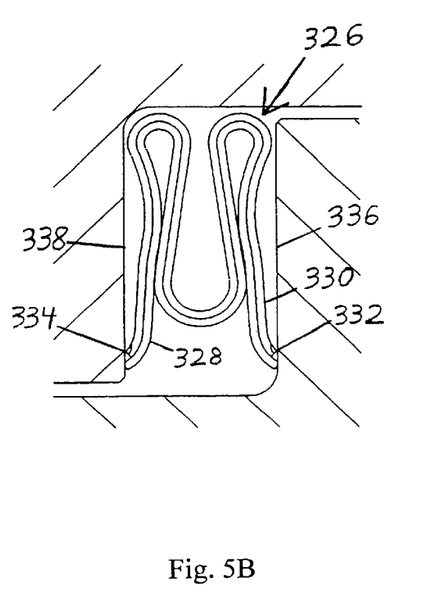
FIG. 5B is a side sectional view of a seal according to the fourth preferred embodiment, depicting the seal installed in a channel between two cooperating sealing faces after compression.

FIG. 5B is a side sectional view of the preferred embodiment of FIG. 5A as implemented in a multiple-ply seal 326 installed in a channel between two cooperating sealing faces 336 and 338 after compression. The features of the non-pressure-facing ply being shorter than the pressure-facing ply and the non-pressure-facing ply edge deformations, ensure that an intermittent sealing line is created along the margin of the system sealing faces 336 and 338 and the non-pressure-facing ply edges 332 and 334, respectively. If a continuous seal were formed along the margin of the system sealing faces 336 and 338 and the non-pressure-facing ply edges 332 and 334, respectively, then any leakage passing by the pressure-facing ply sealing line would be entrapped between the pressure-facing 328 and non-pressure-facing 330 plies. It would then be possible that the full differential pressure would be applied across the non-pressure-facing ply 330, thereby reducing the benefit of multiple-plies by increasing the stress on the non-pressure-facing ply 330. Such edge deformations prevent the possibility of a non-pressure-facing ply from developing complete sealing lines and therefore preclude the possibility of a seal developing between two plies. This improvement ensures maximum spring-rate, or stiffness of a multiple-ply seal.

If a non-pressure-facing ply is made short enough such that its edges are unlikely to contact and seal against the cooperating sealing surfaces, then a seal between the non-pressure-facing ply and the sealing surfaces would be avoided, and leakage passing by the pressure-facing ply would not be entrapped between the pressure-facing and non-pressure-facing plies. This, however, results in lack of support against pressure forces for the pressure-facing ply under some deflection conditions, because there would be no contact force on the non-pressure facing ply or plies' leg regions causing them to deflect and act in concert with the pressure-facing ply's leg regions.

Various leg termination regions may be employed in the seal of the present invention. FIGS. 6A through 6D show four examples of leg termination regions. It will be readily obvious to one skilled in the art that these termination regions are not the only termination regions available to seals made according to the present invention. The termination region 400 shown in FIG. 6A lends itself to lapping or flat abrasive machining. Once a seal using this type of leg termination region is partially deflected, the upper corner of the termination region cross-section 401 defines a very narrow sealing line, which maximizes the sealing contact stress—an important consideration in effective sealing against comparatively smooth cooperating sealing surfaces (16 micro-inches or better).

Figure 6A:
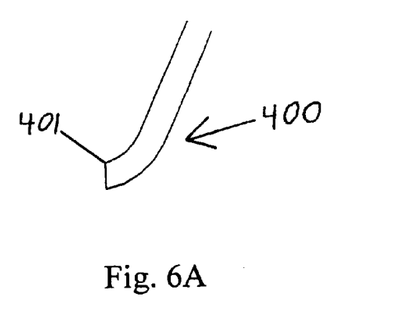
FIG. 6A is a side sectional view of one preferred embodiment of a leg termination region of a seal.
Figure 6B:
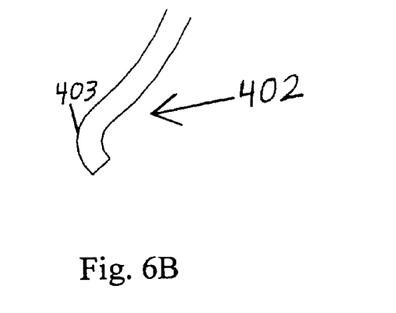
FIG. 6B is a side sectional view of a second preferred embodiment of a leg termination region of a seal.

FIG. 6B shows a termination region 402 with a convex radius 403. This type of termination region also provides line contact when it impinges on a flat surface. An advantage of this type of termination region is that it will seal more effectively against a rougher surface texture, with more widely spaced spiral machining grooves (63 micro-inches or better, as for example in a "concentric lay").

Figure 6C:
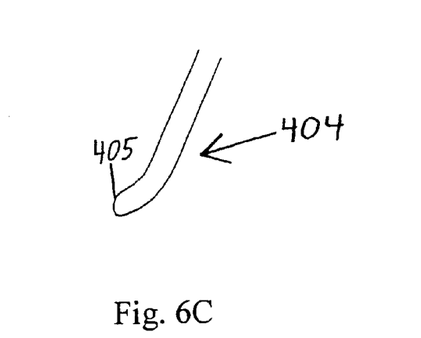
FIG. 6C is a side sectional view of a third preferred embodiment of a leg termination region of a seal.

In the variant 404 of FIG. 6C, a rough flat end is machine dressed to form a convex radius 405. As in each of the previous cases, the sealing surface must be a true surface of revolution. A surface of revolution is used here to refer to the shape of a body generated when a defined curve or spline is rotated about an axis held motionless in space. Every element on the surface of an infinitely thin slice of a radial plane section of the body generating an elemental circle when rotated about an axis contained in such plane. Each element of the plane section of the body being bounded by an elemental circle concentric with all others about the axis. Of course, the invention can include surface shapes and finishes that do not form a surface of revolution as defined above.

Figure 6D:
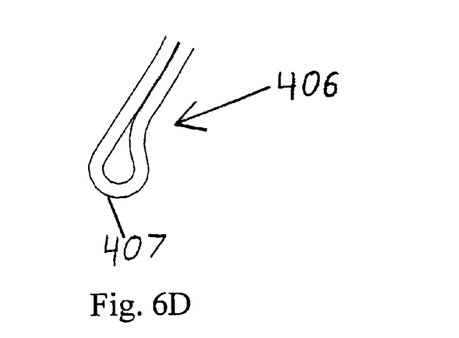
FIG. 6D is a side sectional view of a fourth preferred embodiment of a leg termination region of a seal.

FIG. 6D illustrates one form of termination region 406, which can be applied to a multiple-ply seal. In FIG. 6D, rolling, spinning or die forming may form the convex radius 407. Abrasive machining of this surface produces a surface of revolution with very little material removal.

An additional advantage of seals according to the present invention is its relatively high spring rate, or stiffness. Because the resonant frequency of a convoluted seal is a function of its spring rate, it is sometimes desirable to increase the stiffness to avoid resonances at inherent forcing frequencies of the systems in which the seals are used. In a gas turbine engine, for example, major resonance must be typically avoided at frequencies corresponding to the rotational speed of the engine at various conditions, such as, for example, cruise, take-off, and idle power settings. Seals according to the present invention can also provide, in some embodiments, inherently higher stiffness and resonant frequencies than some two-ply seals without inflection regions, designed to perform similar duties. Additionally, seal characteristics may be varied by adjusting the positions of the inflection regions in the leg regions and/or the convolution's sidewall regions to ensure avoidance of major forcing frequencies, without unacceptably changing the stress levels.

It will be readily apparent to one of ordinary skill in the art that the term seal, as used herein, may refer to any number of shapes whose planform (the contour of an object as viewed from above) outline may, for example, be in the shape of an annulus (e.g., a circular ring), or in the shape of a curvilinear figure, or in the shape of a polygonal figure; where the vertices of any figure forming a seal are arcuate in shape. Further, the differences in seal cross-section between the exemplary embodiments described herein demonstrate that aspects of the invention may be achieved using various seal shapes.

The seals in the preferred embodiments above are preferably formed of metal, such as a metal alloy, but may be alternatively formed of any suitable material (including nonmetallic materials) without departing from the invention.

While various embodiments have been described to illustrate the present invention, it will be understood by those skilled in the art that various modifications and changes can be made therein without departing from the scope of the invention as defined in the appended claims.

What is claimed is:

1. A method for providing a resilient seal between two cooperative components, when the seal is in an installed compressed state, comprising:
    providing the resilient seal between the cooperative components having a convolution region that includes a curved region and a pair of adjacent side wall regions; a pair of leg regions; a pair of acute bend regions; and a pair of leg inflection regions;
    arresting the bending stress in the acute bend regions of the resilient seal; and
    transferring at least part of the bending stress from the acute bend regions to another, less stressed region of the resilient seal in at least one of the convolution region, the pair of leg regions and/or the pair of leg inflection regions,
    wherein each said leg inflection region and each said adjacent side wall region define a gap therebetween sized so that said leg inflection regions contact said adjacent side wall region when the seal is in the installed compressed state.

2. The method according to claim 1, wherein the leg inflection regions arrest the bending stress in the acute bend regions after making contact with the adjacent side wall regions of the convolution region when the resilient seal is compressed.

3. The method according to claim 2, wherein the bending stress is transferred to the inflection regions.

4. A method for providing a resilient multiple-ply seal between two cooperative components when the seal is in an installed compressed state, comprising:
    providing the multiple-ply seal between the two cooperative components, the seal having a pressure-facing ply and at least one adjacent non-pressure-facing ply, wherein the pressure-facing ply has some contact with the at least one non-pressure-facing ply, and wherein the pressure-facing ply and the at least one adjacent non-pressure-facing ply include a convolution region having a curved region and a pair of adjacent side wall regions; a pair of leg regions each having an inflection region thereon; and a pair of acute bend regions;
    arresting the bending stress in the acute bend regions of the pressure-facing ply and the at least one adjacent non-pressure-facing ply; and
    transferring at least part of the bending stress to another, less stressed region of the resilient seal in at least one of the convolution region, the pair of adjacent leg regions and/or the pair of leg inflection regions;
    wherein each said leg inflection region and each said adjacent side wall region define a gap therebetween sized so that said leg inflection regions contact said adjacent side wall regions when the seal is in the installed compressed state.

5. A method for providing a resilient multiple-ply seal between two cooperative components when the seal is in an installed compressed state, comprising:
    providing the multiple-ply seal between the two cooperative components, the seal having a pressure-facing ply and at least one adjacent non-pressure-facing ply, wherein the pressure-facing ply has some contact with the at least one non-pressure-facing ply, and wherein the pressure-facing ply and the at least one adjacent non-pressure-facing ply include a convolution region having a curved region and a pair of adjacent side wall regions; a pair of leg regions each having an inflection region thereon; and a pair of acute bend regions;
    arresting the bending stress in the acute bend regions of the pressure-facing ply and the at least one adjacent non[]pressure-facing ply; and
    transferring at least part of the bending stress to another, less stressed region of the resilient seal in at least one of the convolution region, the pair of adjacent leg regions and/or the pair of leg inflection regions;
    wherein the leg inflection regions of the pressure-facing ply arrest bending stress in said acute bend regions after the pressure-facing ply leg inflection regions contact the adjacent side wall regions of the pressure-facing ply.

6. A method for providing a resilient multiple-ply seal between two cooperative components when the seal is in an installed compressed state, comprising:
    providing the multiple-ply seal between the two cooperative components, the seal having a pressure-facing ply and at least one adjacent non-pressure-facing ply, wherein the pressure-facing ply has some contact with the at least one non-pressure-facing ply, and wherein the pressure-facing ply and the at least one adjacent non-pressure-facing ply include a convolution region having a curved region and a pair of adjacent side wall regions; a pair of leg regions each having an inflection region thereon; and a pair of acute bend regions;
    arresting the bending stress in the acute bend regions of the pressure-facing ply and the at least one adjacent non-pressure-facing ply; and
    transferring at least part of the bending stress to another, less stressed region of the resilient seal in at least one of the convolution region, the pair of adjacent leg regions and/or the pair of leg inflection regions;
    wherein the leg inflection regions of the pressure-facing ply arrest bending stress in said acute bend regions after the side wall regions of the pressure-facing ply contact the adjacent leg regions of the pressure-facing ply.

7. A method for providing a resilient seal between two cooperative components comprising:

providing the resilient seal between the cooperative components, the seal having a convolution region that includes a curved region and a pair of side wall regions, each side wall region having an inflection region thereon; a pair of leg regions, each leg region having an inflection region thereon; and a pair of acute bend regions;

arresting the bending stress in the acute bend regions of the resilient seal; and transferring at least part of the bending stress to another, less stressed region of the resilient seal in at least one of the convolution region, the pair of legs regions, the pair of leg inflection regions and/or the pair of side wall inflection regions.

8. The method according to claim 7, wherein each said leg inflection region and each said adjacent side wall region define a gap therebetween sized so that said leg inflection regions contact said adjacent side wall regions when the seal is in the installed compressed state.

9. The method according to claim 7, wherein the inflection regions of the legs and the inflection regions of the side walls arrest the bending stress in the acute bend regions after the inflection regions of the legs contact the inflection regions of the side walls.

10. The method according to claim 7, wherein the bending stress is transferred to the inflection regions located on the side wall regions and the inflection regions located on the leg regions.

11. The method according to claim 7, wherein the bending stress is transferred to the convolution region.

* * * * *